HYDRAULIC FLUIDS

Robert J. Nankee, Midland, Joseph E. Schrems, Saginaw, and Ernest L. Caldwell, Midland, Mich., assignors to The Dow Chemical Company, Midland, Mich., a corporation of Delaware
No Drawing. Filed Mar. 11, 1964, Ser. No. 351,228
5 Claims. (Cl. 252—73)

This invention relates to a new super high boiling hydraulic fluid having very low pour point and other desirable properties.

Hydraulic fluids, for example automobile brake fluids, are subject to increasingly stringent requirements in their functional properties. For example, there is a constant demand for fluids having higher boiling points, lower pour points, greater lubricity, less corrosiveness toward the numerous metals encountered in hydraulic systems, less rubber swell and less change of viscosity with changing temperature. Frequently a change in composition which improves one or more of these or other essential properties is of little or no value because of a harmful effect on some other property. Thus, most attempts to produce fluids having higher boiling points have resulted in fluids having higher pour point, rubber swell and/or low-temperature viscosity.

According to the present invention, hydraulic fluids are provided which have exceptionally high boiling point and at the same time have very low pour points, low rubber swell and low viscosity at −40° F. In these and all other properties, when compounded with conventional antioxidants and corrosion inhibitors, they easily pass the SAE brake fluid specifications 70R1 and 70R3. These consist entirely, or at least in major part, of one or more compounds having the formula

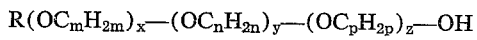

$$R(OC_mH_{2m})_x-(OC_nH_{2n})_y-(OC_pH_{2p})_z-OH$$

wherein R is a primary lower alkyl radical, i.e., one containing 1 to 4 carbon atoms, $m$, $n$ and $p$ are integers from 2 to 4, at least one of them being 2, and $x$, $y$ and $z$ are integers, $x$ and $y$ being 1 to 5 and $z$ being 0 to 3, the sum of $x$, $y$ and $z$ being 4 to 8, at least 50% of the oxyalkylene groups being oxyethylene groups.

U.S. Patent 3,062,747 discloses lower alkyl monoethers of heteric (random) copolymers of ethylene and propylene oxides containing up to about 5 oxyalkylene units. While these are useful as brake fluids suitable for ordinary requirements, they cannot meet heavy duty requirements such as for pour points below −60° F., viscosity at −40° F. not more than 1800 cstks., and boiling points of the order of 550° F. or more. This difference in critical properties apparently stems from the differences in the structure of the polyoxyalkylene chains of the two products; i.e., disordered vs. ordered (heteric vs. block) copolymers.

The compounds of the above formula can be conveniently made by the well known methods for making polyoxyalkylene glycol ethers, as taught, for example, in the above cited patent or in U.S. Patent 2,174,761 or 2,425,755. In general, a suitable procedure consists of condensing a lower alkanol with an alkylene oxide by use of an oxyalkylation catalyst until 1 to 5 moles of oxide have reacted, then continuing the oxyalkylation with a second alkylene oxide until 1 to 5 moles of this oxide have reacted and, optionally, continuing the oxyalkylation with an alkylene oxide which is different from the second oxide, though it may be the same as the first, until up to 3 moles thereof have reacted. The product, after devolatilization, is ready for use.

It is well known in the art that in processes, such as that described above, wherein an alkylene oxide is condensed with a compound containing active hydrogen, the product is not a single compound but rather is a cogeneric mixture of related compounds containing differing numbers of oxaylkylene units. Thus, for example, when 3 moles of alkylene oxide are condensed with 1 mole of alkanol, the product consists of a mixture of ethers containing an average of 3 oxyalkylene groups per molecule but some of the individual components contain more than 3 and some contain less than 3 oxyalkylene groups. Such mixtures of closely related compounds having similar properties are generally useful for the same purposes as the individual compounds and generally no attempt is made to separate them. The compounds of the present invention follow this general rule in that they are usually produced as cogeneric mixtures which can only be described in terms of their average composition. However, since they are of relatively low molecular weight, it is possible to separate them by fractional distillation in vacuum stills. The formulas used herein are intended to represent not only the specific, individual compound but the cogeneric mixture having the indicated average composition.

In making the compounds of the invention it has been found advantageous in certain cases to fractionate, at least partially, the intermediate ether produced by condensing the first alkylene oxide, $C_mH_{2m}O$, with the alkanol, ROH. Thus, if, for instance, a final product is desired having the above formula wherein $x$ is 3, it might be made from an intermediate having the formula $R(OC_mH_{2m})_3$—OH. This intermediate would ordinarily be made by condensing 3 moles of the appropriate alkylene oxide with the alkanol ROH. It may then be used as a cogeneric mixture or it may be fractionated to remove the fraction containing the diglycol ether ($x=2$). The residue may then be used as such or it may be further fractionated to isolate the specific material wherein $x=3$, thus eliminating the small proportion of "highers" that is normally present wherein $x=4$ or more. Such fractionation can also be carried out after the condensation of the second and/or third alkylene oxide, though it becomes increasingly difficult as the molecular weight of the material increases. Ordinarily such later fractionation is limited to a devolatilization step to remove traces of unreacted oxide, glycol and/or low-boiling ethers.

The preparation of the compounds and practice of the invention is illustrated by the following examples.

EXAMPLES 1–9

General procedure

The lower alkanol, ROH, was placed in an autoclave, the catalyst, NaOH, about 0.12% by weight, based on the alcohol, was added, the autoclave was sealed, flushed with nitrogen and heated to 95–110° C. The first alkylene oxide was then fed in until the calculated amount was reached. Heating and stirring were then continued until substantially all of the oxide had reacted, as indicated by the pressure.

The product was then devolatilized in vacuum to remove all compounds boiling below the desired ether.

In the second stage, the product of the above stage was further condensed with a second alkylene oxide and then, in some instances, with a further portion of the first alkylene oxide. The final product was neutralized with phosphoric acid or fatty acid, devolatilized and filtered. Products produced in this way are shown in the following table.

TABLE I.—STRUCTURE OF PRODUCTS
$R(OC_mH_{2m})_x$—$(OC_nH_{2n})_y$—$(OC_pH_{2p})_z$—OH

| Ex. No. | R | m | x | n | y | p | z |
|---|---|---|---|---|---|---|---|
| 1 | Methyl | 2 | 3.2 | 3 | 0.9 | 2 | 0.9 |
| 2 | do | 2 | 3.2 | 3 | 1.2 | 2 | 0.9 |
| 3 | Ethyl | 2 | 3.2 | 3 | 1.0 | 2 | 1.0 |
| 4 | n-Butyl | 2 | 3.4 | 3 | 0.5 | 2 | 0.5 |
| 5 | Methyl | 2 | 3.2 | 3 | 2.7 |  | 0 |
| 6 | n-Butyl | 2 | 3.4 | 3 | 0.5 |  | 0 |
| 7 | Methyl | 3 | 3.0 | 2 | 2.0 |  | 0 |
| 8 | do | 2 | 3.2 | 4 | 0.7 | 2 | 0.9 |
| 9 | n-Butyl | 2 | 4.4 |  | 0 |  | 0 |

The above products, separately and in various combinations, were tested as brake fluids according to SAE Specifications 70R1 and 70R3. Results with the more critical tests are shown in Table II. All materials, when compounded with conventional corrosion inhibitors and antioxidants, readily passed all the other tests in the above specifications. The materials tested in Examples 1–9 of Table II were those described in the corresponding Examples 1–9 of Table I. It may be noted that while the product of Example 9, alone, is not a part of the present invention, it is particularly useful for blending with the other products of the invention to produce brake fluids, as will be shown hereinafter.

TABLE II.—PROPERTIES OF PRODUCTS

| Ex. No. | Viscosity, Cstks. | | | Viscosity Index | Pour Point, °F. | Boiling Point, °F. | Rubber Swell, Percent |
|---|---|---|---|---|---|---|---|
|  | −40° F. | 100° F. | 210° F. |  |  |  |  |
| 1 | 1,525 | 8.29 | 2.16 | 59 | −100 | 526 | 2.5 |
| 2 | 1,610 | 8.26 | 2.14 | 55 | −100 | 560 | 2.4 |
| 3 | 2,040 | 9.35 | 2.42 | 83 | −78 | 563 | 4.2 |
| 4 | 985 | 7.77 | 2.10 | 67 | −100 | 572 | 8.1 |
| 5 | 2,500 | 9.96 | 2.46 | 69 | −97 | 599 | 3.9 |
| 6 | 770 | 6.91 | 1.91 |  | −100 | 552 | 9.4 |
| 7 | 3,000+ | 10.80 | 2.65 | 84 | −96 | 538 | 5.0 |
| 8 | 1,489 | 8.28 | 2.13 | 51 | −100 | 554 | 2.6 |
| 9 | Solid | 8.09 | 2.22 | 86 | −35 | 582 | 6.3 |
| 10 [1] | 1,320 | 8.20 | 2.15 | 61 | −100 | 561 | 3.5 |
| SAE [2] | [3] 1,800 |  |  |  | [3] −58 | [4] 375 | 0.5–4.9 |

[1] Blend of 67.5% by volume of No. 2 and 32.5% of No. 9.
[2] SAE 70R3 minimum specifications.
[3] Maximum.
[4] Minimum.

The data in Table II shows that although many of the products of the present invention qualify in all essential respects as single-component brake fluids (when inhibited with suitable conventional antioxidants and corrosion inhibitors), others are deficient in one or more respects. Thus No. 3, 5 and 7 are too viscous at −40° while No. 4 and 6 swell rubber excessively. These, however, as well as No. 9, are extremely useful for making blends of two or more components, thus improving their deficient properties and taking advantage of their outstanding valuable properties, such as high boiling points and/or low pour points. In addition, unexpected improvements in viscosity were observed in such blends. Thus, for example, when fluid No. 2 was blended with increasing amounts of No. 9 it was found that the pour point remained below the acetone-Dry Ice limit (about −100° F.) until about 32–35% by volume of No. 9 was reached. The pour point then began to rise and at 40% it was −70° F. and at 50% was −53° F. At the same time the −40° F. viscosity dropped in a linear fashion, being 1380 at 25% and 1280 at 40%. This trend continued to 60%, at which point the blend froze after 2 hours at −40°, the viscosity of the liquid being 1130 cstks. It is thus apparent that unexpectedly valuable fluids are obtained by blending up to about 45% by volume of No. 9 with No. 2, the optimum being at about 25–35%. Example 10 in Table II illustrates one such blend.

The compounds of the invention are not only compatible with each other in brake fluid blends but are also compatible with and useful in combination with other conventional non-aqueous brake fluid components, such as the alkylene glycols, diglycols and polyglycols and the simple ethers and esters of such glycols. In general, the brake fluids comprising the products of the invention are compatible with the conventional brake fluid additives such as corrosion inhibitors, antioxidants, etc. Suitable corrosion inhibitors include the borate salts and esters, nitrate salts, mercaptobenzothiazole, etc. Antioxidants include bisphenol A, dialkylphenols and aromatic amines.

We claim:

1. In a method for applying pressure to a hydraulic brake through a hydraulic brake fluid, the improvement wherein the brake fluid consists essentially of at least one compound having the formula $$R(OC_mH_{2m})_x\text{—}(OC_nH_{2n})_y\text{—}(OC_pH_{2p})_z\text{—OH}$$

wherein R is a primary lower alkyl radical, $m$, $n$ and $p$ are integers from 2 to 4, at least one of them being 2, $n$ being different from both $m$ and $p$ and $x$, $y$ and $z$ are integers, $x$ and $y$ being 1 to 5 and $z$ being 0 to 3, the sum of $x$, $y$ and $z$ being 4 to 8, at least 50% of the oxyalkylene groups being oxyethylene groups.

2. A method as defined in claim 1 wherein $m$ and $p$ are each 2 and $n$ is 3.

3. A method as defined in claim 1 wherein $x$ is 3 to 4, $y$ is 1 to 3, $z$ is 1 to 2 and $x+y+z=5$ to 7.

4. A method as defined in claim 2 wherein $x$ is 3 to 4, $y$ is 1 to 2 and $z$ is 1.

5. A method as defined in claim 4 wherein R is methyl.

References Cited
UNITED STATES PATENTS 3,030,426  4/1962  Moseley et al. _____ 260—615
3,062,747  11/1962  Fife et al. _____ 252—73

LEON D. ROSDOL, *Primary Examiner.*

R. D. LOVERING, S. D. SCHWARTZ,
*Assistant Examiners.*